United States Patent [19]

Kurashima et al.

[11] Patent Number: 4,786,795

[45] Date of Patent: Nov. 22, 1988

[54] SUN TRACKING DEVICE FLOATING UPON LIQUID SURFACE

[75] Inventors: Shozo Kurashima, Chiba; Yasuhiko Umezawa, Kanagawa, both of Japan

[73] Assignee: Kyocera Corporation, Kyoto, Japan

[21] Appl. No.: 846,706

[22] Filed: Mar. 31, 1986

[30] Foreign Application Priority Data

Mar. 29, 1985 [JP] Japan .................................. 60-63340
Jun. 25, 1985 [JP] Japan ............................. 60-97383[U]
Aug. 28, 1985 [JP] Japan ........................... 60-132363[U]

[51] Int. Cl.$^4$ ............................................... G01J 1/20
[52] U.S. Cl. .................... 250/203 R; 126/425
[58] Field of Search .................... 126/425; 250/203 S, 250/203 R; 353/3

[56] References Cited

U.S. PATENT DOCUMENTS

| | | | |
|---|---|---|---|
| 4,159,629 | 7/1979 | Korr et al. | 126/425 |
| 4,276,122 | 1/1981 | Snyder | 250/203 S |
| 4,340,812 | 7/1982 | Mori | 250/203 S |
| 4,649,899 | 3/1987 | Moore | 126/425 |

Primary Examiner—David C. Nelms
Assistant Examiner—Michael Messinger
Attorney, Agent, or Firm—Spensley Horn Jubas & Lubitz

[57] ABSTRACT

This invention relates to a sun tracking device which provides efficient utilization of sun light by tracking the motion of the sun, so that the light of the sun may be received in a sun light utilization device for performing solar power generation or solar power collection. Efficient utilization of solar power is achieved by using a rotatable table floatingly supported on the surface of a liquid, with a pair of solar cells mounted on this table which also carries the solar power utilization device. The solar cells have different light receiving directions, and function as a sun light position detecting means. The table is rotated according to the output of the solar cells by means of screws, pumps, drive belts, or the like.

16 Claims, 6 Drawing Sheets

SUN TRACKING DEVICE FLOATING UPON LIQUID SURFACE

BACKGROUND OF THE INVENTION

1. Field of the Invention

The present invention relates to a sun tracking device for use in a solar power generation system, in a solar power collection system, or in other solar power utilization systems; and more specifically relates to a su tracking device which can provide a high sun light collecting efficiency by tracking the direction of the sun, which of course changes with time.

2. Description of the Prior Art

For some considerable time now, attention has been paid to solar power generation, which makes use of inexhaustible and free energy source in place of diminishing energy sources such as oil. However, in such solar power generation systems, because the cost of silicon as the material for solar cells is so high and the energy conversion efficiency thereof is so low, in the order of 10% to 15%, that the time required for recovering the cost of construction of such a power generation system may extend a number of years, this fact prevented a successful commercialization of such solar power generation.

Therefore, with the aim of improving the efficiency of solar energy conversion, various research and development efforts have been spent in placing Fresnel lenses and other sun light collecting devices in front of a solar cell array, and designing hybrid systems which utilize both sun light and sun heat; but even in such systems substantial improvement is sun light collecting efficiency cannot be achieved without providing a sun tracking device which can rotate the solar cell array in the direction of sun light from sun rise to sun set.

As such a tracking device, there exists a prior art type device in which: a multitude of solar cell arrays are arranged on a rotatable table which can rotate in a horizontal plane; a plurality of light sensors (photodiodes and so on) set at different angles with respect to the direction of rotation of the rotatable table are mounted on the rotatable table; and the deviation between the light receiving plane of the solar cell arrays and the sun light is detected from the difference in the light receiving amounts between the light sensors; so that the sun light may be tracked by rotating the turntable following the changes in the direction of sun light. This type of system is disclosed in Japanese Patent Laid Open Publication No. 58-193510, among other sources.

However, in such prior arts, support members for the solar cell arrays, as well as a large number of solar cell arrays, are mounted on the rotatable table, and the rotatable table itself has to have a certain strength for supporting them, and therefore the weight load on the rotatable table and upon the support means therefor becomes extremely great, thereby requiring a large drive energy for driving the rotatable table and preventing satisfactory improvements in the energy conversion efficiency which can justify the increase in the cost of construction.

Furthermore, according to such prior arts, since the weight burden on the rotatable table is great, the design thereof requires the support base for rotatably supporting the rotatable table to be sufficiently strong and the frictional resistances arising from the rotation of the rotatable table to be as small as possible, and such disadvantages as complexity of the structure, bulkiness of the overall structure, and increase in the construction cost inevitably ensue.

SUMMARY OF THE INVENTION

Accordingly, it is the primary object of the present invention to provide a sun tracking device, which avoids the above described problems.

It is a further object of the present invention to provide such a sun tracking device can reduce the drive energy requirements for driving the rotatable table to an extremely low level, and can support and drive the rotatable table with a simple structure.

It is a further object of the present invention to provide such a sun tracking device, which can drive the rotatable table for tracking without consuming the power which is generated by the solar cell array for power generation in a solar power generation device using the solar cell array mounted on the rotatable table.

It is a yet further object of the present invention to provide such a sun tracking device, which is efficient and low in cost.

Other objects of this invention will be explained hereinbelow with reference to the drawings and the preferred embodiments.

According to the present invention, these and other objects are accomplished by a sun tracking device, riding on the surface of a body of liquid, comprising: (a) a rotatable table which is substantially supported by floatation on the surface of the liquid; (b) a means for keeping the rotatable table substantially in a determinate translational position on the surface of the liquid while allowing the rotatable table to rotate; (c) a means for rotationally positioning the rotatable table on the surface of the liquid; (d) a means for detecting deviation of the angular position of the sun with relation to the rotatable table to either side of a certain line on the rotatable table; and: (e) a means for controlling the rotational positioning means according to the operation of the detecting means so as to reduce the deviation of the angular position of the sun with relation to the rotatable table to either side of the certain line on the rotatable table substantially to zero.

The expression "the rotatable table is substantially supported by floatation on the surface of the liquid" includes the case that the rotatable table is internally provided with a floating force in the rotatable table itself so as to keep the rotatable table substantially at the same level as the liquid surface, and also the case that the rotatable table has attached to it a floatation means which is separate from the rotatable table and which holds the rotatable table above the liquid surface.

The liquid surface for floating the rotatable table thereon generally would be the water surface of a lake, a pond, a river, or a sea, but could also be an oil surface, for instance, in the case that the rotatable table were used as a floating roof of a crude oil tank. Particularly when the rotatable table is to be provided as floating on a sea or lake, the support means for the table, such as the aforesaid means for keeping the rotatable table substantially in a determinate translational position on the surface of the liquid, and the rotatable table, must be mutually variable in distance according to changes in the height of the liquid surface which may for instance be caused by the sea level variation due to tides or water accumulation caused by strong winds, so that the sun light utilization device mounted on the rotatable table should never be submerged under the sea.

The control means may comprise a light sensor for detecting the changes in the light receiving amount of the sun light utilization device and a drive means for rotating the rotatable table by a certain angle according to the signal detected by the light sensor, but also it is possible that the control means should comprise a pair of solar cells having a phase difference in their angles relative to the rotational direction of the rotatable table, so that the rotatable table may be rotatable according to the difference between the outputs of the solar cells, thereby simplifying the circuit structure and eliminating any need for a special drive source in such a manner as to allow semi permanent tracking of sun light.

The sun light utilization device is not limited by solar cell arrays, solar collectors, but also means all other sun light utilization devices.

The inventors propose, as preferred embodiments of the present invention, such a sun tracking device as described above, wherein the means for detecting deviation of the angular position of the sun with relation to the rotatable table to either side of a certain line on the rotatable table comprises a pair of solar cells oriented at different angles relative to the certain line on the rotatable table, in which case the means for controlling the rotational positioning means according to the operation of the detecting means may do so according as to which one of the pair of solar cells has the greater output; or a sun tracking device, riding on the surface of a body of liquid, comprising: (a) a rotatable table which is substantially supported by floatation on the surface of the liquid; (b) a pair of solar cells mounted on the rotatable table at different orientations; (c) a motor driven by the solar cells; (d) a plurality of first rotating bodies rotationally driven by the driving force of the motor; (e) a plurality of second rotating bodies provided externally to the rotatable table; (f) a plurality of second rotating bodies provided externally to the rotatable table; (g) a plurality of drive force transmitting members arranged between the first rotating bodies and the second rotating bodies so as to constitute at least two drive force transmitting systems; and: (h) a means for controlling the rotation of the motor and switching over the rotational direction of the driving force transmitting systems according to the amounts of light received by each of the pair of solar cells; (i) whereby the rotatable table is rotated so as to track the sun.

BRIEF DESCRIPTION OF THE DRAWINGS

In the preferred drawings, which should not particularly be considered as limitative of the present invention, since they are only provided for the purposes of explanation and clarification:

FIGS. 1 to 4 show a solar power generating system which incorporates a sun tracking device which is the first preferred embodiment of the present invention:

FIG. 1 is a side view thereof;

FIG. 2 is a plan view thereof;

FIG. 3 is a perspective view showing the arrangement of two solar cells of the first preferred embodiment which fulfill the function of sensors.

FIG. 5 is a side view thereof; and

FIGS. 6(a) to 6(c) are plan view for illustrating the sun tracking action of the second preferred embodiment sun tracking device.

FIG. 8 is a plan view thereof; and

FIG. 9 is a side view thereof.

DETAILED DESCRIPTION OF THE PREFERRED EMBODIMENTS

Now, the present invention will be described in detail in terms of the preferred embodiment thereof and with reference to the appended drawings. The dimensions, materials, shapes, and relative arrangements of the structural components of these embodiments, insofar as such specific limitations are detailed herein, are not intended to be limitative of the scope of the present invention, which is to be delimited solely by the scope of the appended Claims.

Figure 1:
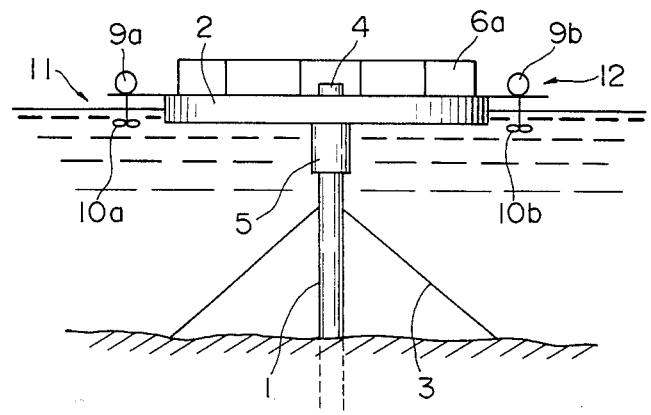
Figure 2:
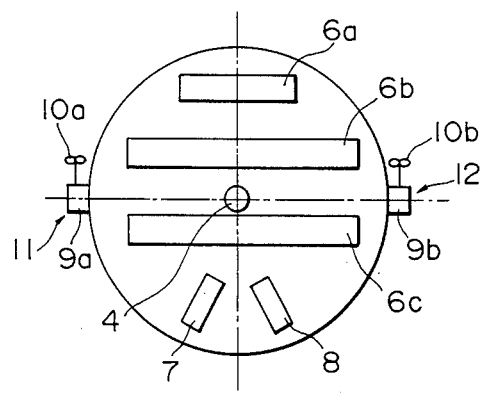
Figure 3:
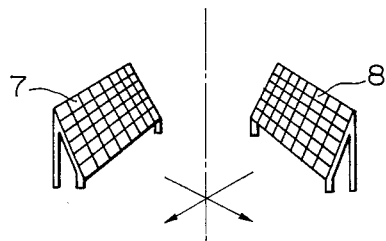

FIGS. 1 through 4 show a solar power generating system with incorporates the first preferred embodiment of the sun tracking device of the present invention, which is constituted to be arranged on a body of water such as a sea or a lake. In FIGS. 1 and 2, reference numeral 1 denotes a fixed shaft which rotatably supports a rotatable table 2. This fixed shaft 1 is erected in a generally perpendicular orientation with its base end buried in the lake or sea bottom, and is reinforced by guy wires 3 extending slantingly downwards from a mid point of the fixed shaft 1, whose other ends are engaged to the lake or sea bottom.

The rotatable table 2 is rotatably and somewhat loosely fitted to the fixed shaft 1 by way of a fitting portion 5 of tubular shape and a rotatable shaft 4, so that even if the level of the water rises and falls, within certain limits of course, the rotatable table 2 may remain rotatably and loosely fitted to the fixed shaft 1. The rotatable table 2 is internally equipped with a floatation force providing means which may include a set of buoys or the like, or is externally provided with a floatation force providing means which may be a set of buoys made of urethane, rubber or the like and thereby is caused to float on the surface of the water in a generally horizontal orientation while being substantially freely rotatable in a horizontal plane about the vertical central axis of the fixed shaft 1, with a certain amount of play of the rotatable table 2 relative to the central axis of the fixed shaft 1 being allowed, both in the sideways direction, in the longitudinal direction and with respect to angular turning relative to the fixed shaft 1, in order to compensate for transitory undulations such as waves of the water surface which cause wobbling of the rotatable table 2 with respect to the fixed shaft 1 through a certain wobbling range.

As generally shown in FIG. 2, the upper surface of the rotatable table 2 is provided with a plurality of solar cell arrays 6 such as 6a, 6b and 6c which are used for power generation, and further carries a pair of solar cell arrays 7 and 8 which serve as sensors, and the circumference of the rotatable table 2 is further provided with two tracking drive mechanisms 11 and 12, which respectively comprise screws 10a and 10b and DC motors 9a and 9b respectively drivingly coupled thereto.

The solar cell arrays for power generation 6a, 6b, and 6c are arranged on the rotatable table 2 in a mutually spaced manner with their long axes being substantially parallel, and, as will be seen later, for an exemplary one of these systems installed in the northern hemisphere, are directed generally to the south with a certain inclination to the east or to the west of south according to the position of the sun, being swiveled about a vertical axis as the rotatable table 2 turns about the axis of the fixed shaft 1 according to the motion of the sun as will be seen later. The common elevation angle of these solar cell arrays 6a, 6b and 6c is appropriately adjusted according to the latitude of the location when the solar power generating system is installed. On the other hand, the solar cell arrays 7 and 8 are arranged in a symmetrical manner on either side of the axis of symmetry of the construction, which is perpendicular to the long axes of the solar cell arrays 6a, 6b and 6c and passes through the rotational shaft 4, and the solar cell arrays 7 and 8 are angled for instance at an angle of about 30° to the axle of symmetry, as exemplarily shown in FIGS. 2 and 3, with their light receiving surfaces faced inwardly. As suggested in FIG. 3, optionally the surface cell arrays 7 and 8 may be canted or sloped, so as to receive a good and adequate amount of sun light, depending upon the latitude of installation of the solar power generating system.

These two solar cell arrays 7 and 8 are respectively electrically connected to the DC motors 9a and 9b arranged on the respective sides of the rotatable table 2, and propeller screws 10a and 10b connected to these DC motors 9a and 9b are respectively rotated at powers or torques c and d corresponding to the respective voltages a and b produced by the solar cell arrays 7 and 8. The two DC motors 9a and 9b are arranged along the line perpendicular to the aforesaid axis of symmetry which diametrically passes through the central axis of the rotational shaft 4, while the screws 10a and 10b are arranged so as when rotated by the two DC motors 9a and 9b to impel water in the direction parallel to the axis of symmetry away from the solar cell arrays 7 and 8. Thus, the rotational force exerted by the action of the screw 10a on the rotatable table 2 is such as to turn the rotatable table 2 in the anticlockwise direction as seen in the figure, while on the other hand the rotational force exerted by the action of the screw 10b on the rotatable table 2 is such as to turn the rotatable table 2 in the clockwise direction as seen in the figure.

Now, the operation of this first preferred embodiment will be described with reference to FIGS. 4(a), 4(b), and 4(c).

Figure 4A:
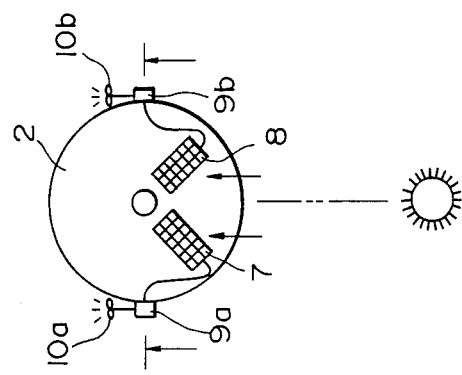
FIGS. 4(a) to 4(c) are illustrative drawings for describing the sun tracking action of the first preferred embodiment sun tracking device.

In FIG. 4(a), the case is shown that the angular position in a horizontal plane of the sun with respect to the sun tracking device is on the line of symmetry previously defined, although of course the sun is elevated above the line of symmetry. In this case, the voltage a produced by the solar cell array 7 is substantially equal to the voltage b produced by the solar cell array 8, and accordingly the rotational forces c and d exerted on the rotatable table 2 by the turning actions of the screws 10a and 10b are substantially equal, so that the rotatable table 2 is not substantially rotated thereby in either rotational direction.

Figure 4B:
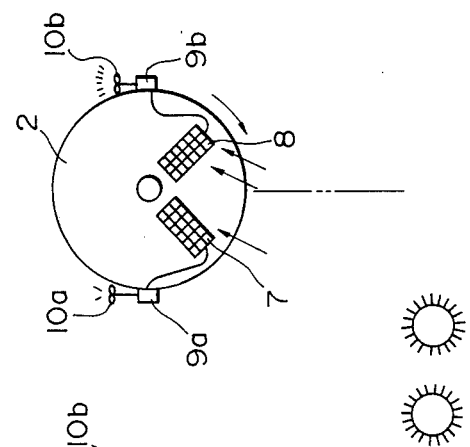

In the case that, as exemplarily shown in FIG. 4(b), the rotatable table 2 becomes somewhat angled away from the direction of the sun light due to an effect produced by waves or the like or due to motion of the sun, so that the angular position in a horizontal plane of the sun with respect to the sun tracking device is displaced towards the solar cell array 7 from the line of symmetry previously defined, then the voltage a produced by the solar cell array 7 becomes less than the voltage b produced by the solar cell array 8, and accordingly the rotational force c exerted on the rotatable table 2 by the turning action of the screw 10a becomes substantially less than the rotational force d exerted on the rotatable table 2 by the turning action of the screw 10b, so that the rotatable table 2 is as an overall effect rotated thereby in the clockwise rotational direction as seen in the figure and as shown by the arrow therein, thereby bringing the angular position in a horizontal plane of the sun with respect to the sun tracking device closer to the line of symmetry of the apparatus.

Figure 4C:
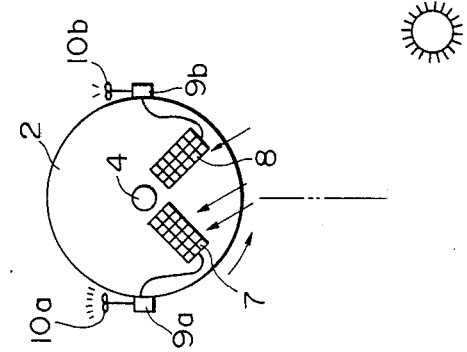

And, on the other hand, as exemplarily shown in FIG. 4(c) in the case that the rotatable table 2 becomes somewhat angled in the other direction away from the direction of the sun light due to such an effect produced by waves or the like or due to motion of the sun, so that the angular position in a horizontal plane of the sun with respect to the sun tracking device is displaced towards the other solar cell array 8 from the line of symmetry previously defined, then the voltage a produced by the solar cell array 7 becomes greater than the voltage b produced by the solar cell array 8, and accordingly the rotational force c exerted on the rotatable table 2 by the turning action of the screw 10a becomes substantially greater than the rotational force d exerted on the rotatable table 2 by the turning action of the screw 10b, so that the rotatable table 2 is as an overall effect rotated thereby in the anticlockwise rotational direction as seen in the figure and as shown by the arrow therein, thereby, again, bringing the angular position in a horizontal plane of the sun with respect to the sun tracking device closer to the line of symmetry of the apparatus.

As a result of these actions which function together to produce a feedback position regulatory mechanism, it will be easily understood that the rotatable table 2 maintains its orientation with the sun square on to the line of symmetry and with the light of the sun impinging squarely upon the solar cell arrays 6a, 6b and 6c, so that the solar cell arrays are caused to generate the maximum amount of electricity practicable. As the sun moves through the sky during the day from sunrise through noon to sunset, the rotatable table 2 rotates appropriately following changes in the direction of the sun light, generally keeping the relative orientation to the sun as shown in FIG. 4(a), and thereby the solar cell arrays 6a, 6b and 6c are enabled throughout the day to be best oriented for power generation. This is repeated day after day.

Since the rotatable table 2 and the fixed shaft 1 are fitted together in a loose manner by way of the fitting portion 5 of tubular shape, even when there are fluctuations in the water level due to sea tide, high waves, high wind, or the like, these fluctuations are absorbed and the rotatable table 2 can be always kept floating on the water surface.

According to this embodiment, since the rotatable table is kept in a floating state on the liquid surface, the weight burden of the rotatable table 2 imposed on the fixed shaft 1 may be reduced almost to zero, with the result that the drive energy required for rotatably driving the rotatable table 2 can be reduced to a very small level, and thereby a substantial improvement in energy conversion efficiency of the solar power generation system as a whole can be achieved.

Since there is almost no weight burden on the rotatable table 2, the support means for rotatably supporting the rotatable table 2 can be made of a very simple structure, and a substantial reduction in construction cost as compared with a conventional type of solar power generation system can be achieved.

Figure 5:
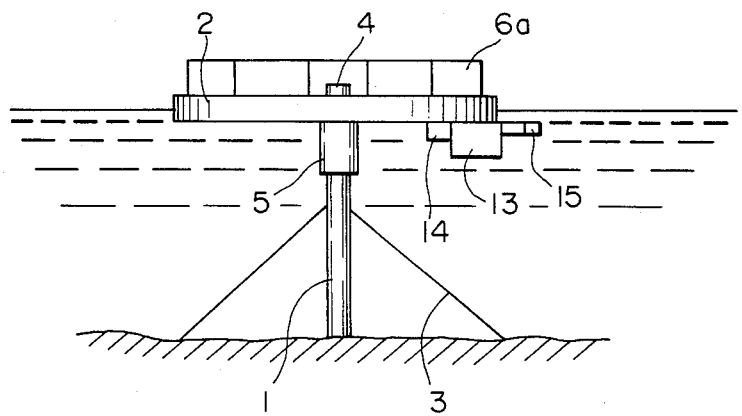
FIGS. 5 and 6 show a solar power generating system which incorporates a sun tracking device according to a second preferred embodiment of the present invention.
Figure 6:
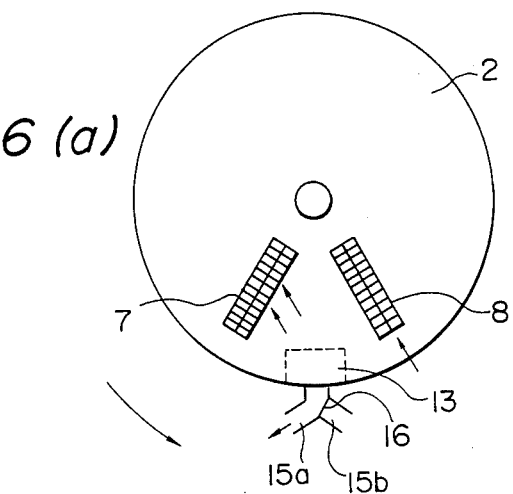
Figure 6:
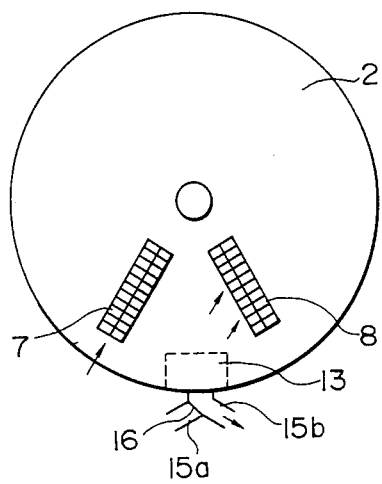
Figure 6:
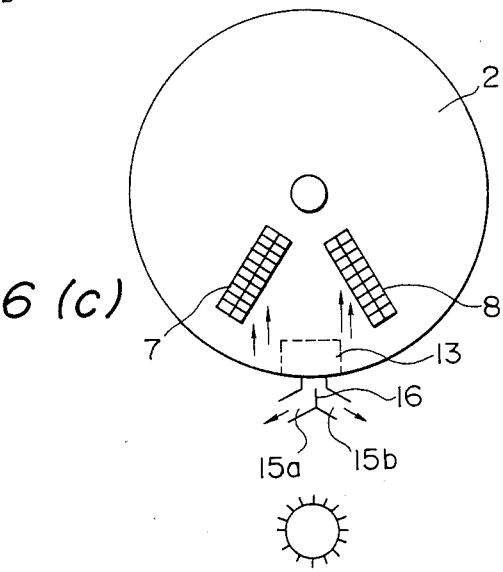

FIG. 5 is a side view of a solar power generating system which incorporates the second preferred embodiment of the sun tracking device of the present invention, and FIGS. 6(a), 6(b), and 6(c) are plan views serving for illustrating both its construction and its operation. Parts of this second preferred embodiment which corresponds to parts of the first preferred embodiment shown in FIG. 2 are designated by like reference numerals.

In this second preferred embodiment, the upper surface of the rotatable table 2 is as before provided with a plurality of solar cell arrays for power generation such as 6a, 6b, and 6c and so on of the first preferred embodiment (not particularly shown in FIGS. 6(a), 6(b), and 6(c)), with a pair of solar cell arrays 7 and 8 which as before serve as sun light sensors, with a water impelling pump 13 provided at one point on the circumference of the rotatable table 2 for sucking up and expelling the water below the rotatable table 2, and with a water jet direction varying means 14 incorporating such means as a switch valve for selectably rotating the rotatable table 2 about the fixed shaft 1 by directing the aforesaid water expelled by the pump 13 in any desired one of several directions. The drive pump source for the pump 13 is the electric power generated by the solar cell arrays 6a, 6b and 6c.

FIGS. 6(a) to 6(c) are plan views for illustrating the tracking action of the sun tracking device of this second preferred embodiment. As before, the solar cell arrays 6a, 6b, and 6c for power generation are arranged on the rotatable table 2 in a mutually spaced manner with their long axes being substantially parallel, and the common elevation angle of these solar cell arrays 6a, 6b and 6c is as before appropriately adjusted according to the latitude of the installation location, when the solar power generating system is installed. And, as before, the solar cell arrays 7 and 8 are arranged in a symmetrical manner on either side of the axis of symmetry of the construction, which is perpendicular to the long axes of the solar cell arrays 6a, 6b and 6c and passes through the rotational shaft 4, and the solar cell arrays 7 and 8 are angled for instance at an angle of about 30° to the axis of symmetry, as exemplarily shown in FIGS. 6(a) through 6(c) with their light receiving surfaces faced inwardly. As before, optionally the solar cell arrays 7 and 8 may be canted or sloped, so as to receive a good and adequate amount of sun light, depending upon the latitude of installation of the solar power generating system.

These two solar cell arrays 7 and 8 are respectively electrically connected to an electrical control system, not particularly shown in the figures and not particularly disclosed herein with regard to its structure but only with regard to its function, since based upon the functional descriptions herein various possible constitutions could easily be conceived of by a person of ordinary skill in the art without undue experimentation. And the pump 13 may in fact be provided at an arbitrary position of the rotatable table 2, for instance under its outer circumference. In the shown second preferred embodiment, this pump 13 is shown as provided at a circumferential point substantially equidistant between the solar cell arrays 7 and 8 for the convenience of illustration, but in fact it may be provided at any arbitrary position on the rotatable table 2. However, if the pump 13 is closer to the outer circumference, there will be some saving in energy consumption.

The pump 13 is driven by a power source which may be the combined voltage produced by the solar cell arrays 7 and 8 or some other power source, and sucks in water from a water inlet 14 and ejects it from a water ejection opening 15. The water ejection opening 15, as shown in FIGS. 6(a) to 6(c), is actually branched at a branch point into two water ejection openings 15a and 15b which point in substantially opposite directions, and a valve 16 is provided at the branching point between the water ejection opening 15a and the water ejection opening 15b so that the direction of ejection of the water expelled by the pump 13 can be ejected over between the water ejection opening 15a and the water ejection opening 15b, according to the set position of the valve 16. The switch over of this valve 16 is performed by a servo means not particularly shown, and is controlled by the aforesaid electrical control system not shown in the drawing, according to the relative amounts of sun light received by the solar cell arrays 7 and 8. In more detail, the electrical control system functions in the following way: if the amount of light receiving by the solar cell array 7 is greater than the amount of light received by the solar cell array 8, then the electrical control system actuates the valve 16 to close the water ejection opening 15b and to open the water ejection opening 15a; if the amount of light received by the solar cell array 7 is less than the amount of light received by the solar cell array 8, then the electrical control system actuates the valve 16 to open the water ejection opening 15b and to close the water ejection opening 15a; and if the amount of light received by the solar cell array 7 is substantially equal to the amount of light received by the solar cell array 8 (optionally within a certain tolerance so as to eliminate so called hunting), then the electrical control system actuates the valve 16 to be positioned substantially in the middle so as to allow water ejection from both the water ejection openings 15a and 15b in substantially the same amount.

Now, the action of this second preferred embodiment will be described with reference to FIGS. 6(a), 6(b), and 6(c). It is similar to the operation of the first preferred embodiment, with certain differences.

In FIG. 6(c), the case is shown that the angular position in a horizontal plane of the sun with respect to the sun tracking device is on the line of symmetry between the solar cell array 7 and the solar cell array 8, although of course the sun is elevated above the line of symmetry. In this case, the voltage a produced by the solar cell array 7 is substantially equal to the voltage b produced by the solar cell array 8, and accordingly as specified above the electrical control system positions the valve 16 in the middle, so that water is ejected from both the water ejection openings 15a and 15b in substantially the same amount, and the rotatable table 2 is not substantially rotated thereby in either rotational direction.

In the case that, as exemplarily shown in FIG. 6(b), the rotatable table 2 becomes somewhat angled away from the direction of the sunlight due to an effect produced by waves or the like or due to motion of the sun, so that the angular position in a horizontal plane of the sun with respect to the sun tracking device is displaced towards the solar cell array 7 from the line of symmetry previously defined, then the voltage a produced by the solar cell array 7 becomes less than the voltage b produced by the solar cell array 8, and according to this as specified above the electrical control system positions the valve 16 to a position to close the water ejection opening 15a and to open the water ejection opening 15b, so that water is ejected from the water ejection opening 15b but substantially not from the water ejection opening 15a, so that the rotatable table 2 is as an overall effect rotated thereby in the clockwise rotational direction as seen in the figure and as shown by the arrow therein, thereby bringing the angular position in a horizontal plane of the sun with respect to the sun tracking device closer to the line of symmetry of the apparatus.

On the other hand, as exemplarily shown in FIG. 6(a) in the case that the rotatable table 2 becomes somewhat angled in the other direction away from the direction of the sun light due to such an effect produced by waves or the like or due to motion of the sun, so that the angular position in a horizontal plane of the sun with respect to the sun tracking device is displaced towards the other solar cell array 8 from the line of symmetry previously defined, then the voltage a produced by the solar cell array 7 becomes greater than the voltage b produced by the solar cell array 8, and according to this as specified above the electrical control system positions the valve 16 to a position to close the water ejection opening 15b and to open the water ejection opening 15a, so that water is ejected from the water ejection opening 15a but substantially not from the water ejection opening 15b, so that the rotatable table 2 is as an overall effect rotated thereby in the anticlockwise rotational direction as seen in the figure and as shown by the arrow therein, thereby again bring in the angular position in a horizontal plane of the sun with respect to the sun tracking device closer to the line of symmetry of the apparatus.

As a result of these actions which function together similarly to the action of the first preferred embodiment to produce a feedback position regulatory mechanism, it will be easily understood that the rotatable table 2 maintains its orientation with the sun square on to the line of symmetry and with the light of the sun impinging squarely upon the solar cell arrays 6a, 6b and 6c, so that the solar cell arrays are caused to generate the maximum amount of electricity practicable. And, as before, as the sun moves through the sky during the day from sunrise through noon to sunset, the rotatable table 2 rotates appropriately following changes in the direction of the sun light, generally keeping the relative orientation to the sun as shown in FIG. 6(a), and thereby the solar cell arrays 6a, 6b and 6c are enabled throughout the day to be best oriented for power generation. And this is repeated day after day. Therefore, the solar cell arrays 6a, 6b and 6c on the rotatable table 2 can efficiently absorb solar energy.

Thus, according to this second preferred embodiment, since the valve 16 is switched over according to the changes in the position of the rotatable table 2 relative to the sun, and the direction of the ejection of the water sucked by the pump 13 is thereby varied, the solar cell arrays 6a, 6b and 6c on the rotatable table 2 are always directed to the sun, and efficient utilization of solar energy becomes possible.

FIG. 7 shows a third preferred embodiment of the present invention in which those of this third preferred embodiment which correspond to parts of the first and second preferred embodiments shown in FIGS. 1 through 6 are designated by like reference numerals. In this third preferred embodiment, in place of the tracking drive means of the second preferred embodiment which comprised the pump 13, the water ejection opening 15, and the valve 16, the positional control of the rotatable table 2 is performed by a tracking drive means including a motor 17 and screws 18a and 18b provided on both ends of the motor 17 which can be selectively driven according to the operation of an control system, not particularly shown.

The motor 17 may be driven by the combined power outputs of the solar cell arrays 7 and 8 or from some other power source, and the screws 18a and 18b are rotated in a selective manner according to the relative amounts of light received by the solar cell array 7 and the solar cell array 8. The control system, again not particularly shown in the figures and not particularly disclosed herein with regard to its structure but only with regard to its function since based upon the functional descriptions herein various possible constitutions could easily be conceived of by a person of ordinary skill in the relevant art without undue experimentation, causes the drive force of the motor 17 to be selectively transmitted to the screws 18a and 18b in such a manner that: if the amount of light received by the solar cell array 7 is greater than the amount of light received by the solar cell array 8, then the screw 18a is rotated while the screw 18b is not substantially rotated; if the amount of light received by the solar cell array 7 is less than the amount of light received by the solar cell array 8, then the screw 18b is rotated while the screw 18a is not substantially rotated; and if the amount of light received by the solar cell array 7 is substantially equal to the amount of light received by the solar cell array 8 (again optionally within a certain tolerance so as to eliminate so called hunting), then neither of the screws 18a and 18b is rotated, or alternatively the screws 18a and 18b are rotated together at the same rotational speed.

It will be easily understood by one of ordinary skill in the art, based upon the descriptions herein, that an essentially similar sun tracking effect is available with this third preferred embodiment. For example, as shown in FIG. 7(b), a single screw 18C may be coupled to the motor shaft in the position indicated, so that the table 2 is rotated in either clockwise or anticlockwise direction in the figure depending upon the direction of rotation of the screw 18C. A control system for use in the modified embodiment in FIG. 7(b) is shown in FIG. 7(c). In FIG. 7(c), the outputs of the solar cell arrays 7 and 8 are fed to an adder with the polarities of the two outputs being reversed with each other, and the output of the adder is applied through an amplifier to the motor 17. If the output from the solar cell array 7 is greater than that from the solar cell array 8, the output from the adder is positive (+) in polarity; and if the output from the solar cell array 7 is less than that from the solar cell array 8, the output from the adder is negative (−).

In the former, the screw is rotated to rotate the table 2 in anticlockwise direction in FIG. 7(c), and in the latter, the same is rotated reversely to rotate the table 2 in clockwise direction.

Figure 7A:
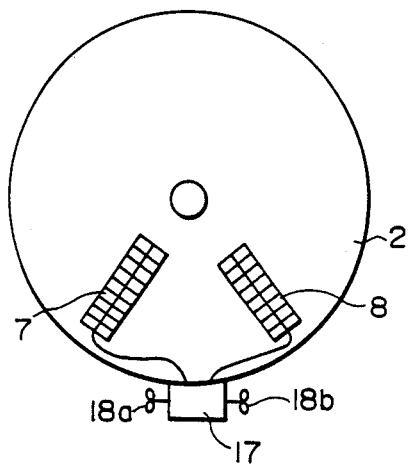
FIG. 7(a) is a plan view of a solar power generating system which incorporates a sun tracking device according to a third preferred embodiment of the present invention.
Figure 7B:
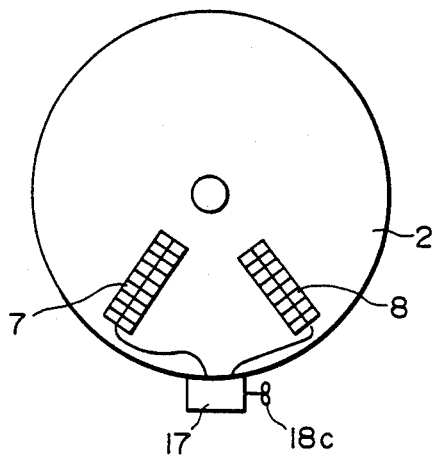
FIG. 7(b) is a modification of the embodiment shown in FIG. 7(a)
Figure 7C:
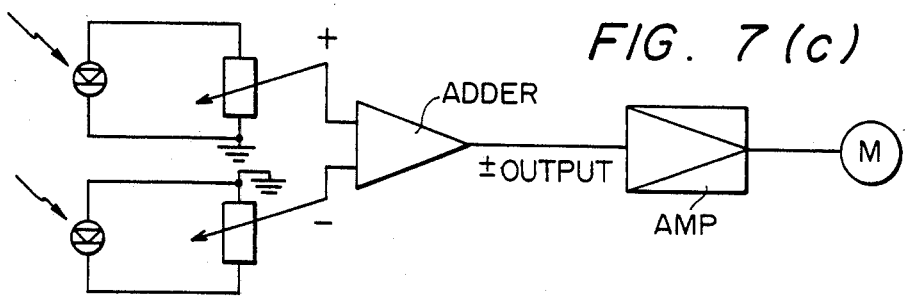
FIG. 7(c) is a diagram of a control circuit for use in the embodiment shown in FIG. 7(b).

Although in the above described third preferred embodiment shown in FIGS. 7(a) and 7(b), the tracking drive means is shown as located in the middle of the solar cell arrays 7 and 8 which are used as sensors, in fact in variant constructions the drive source for the motor 17 may be placed on the side of the rotatable table 2, on the under side surface of the rotatable table 2, or in some other position. The same effects and benefits would be obtained.

Thus, according to the above described three preferred embodiments, since the rotatable table 2 is arranged in a floating state on the surface of the liquid which in the preferred case is water and is contained in a lake or sea, the burden of the weight of the rotatable table 2 on the other parts of the apparatus, in particular on the vertical shaft 1, can be reduced almost to zero, and therefore the drive energy required for rotatably driving this rotatable table 2 can be reduced to a very low level so as to achieve a substantial improvement in energy efficiency. And, since there is almost no weight burden on the rotatable table 2, the support structure for rotatably supporting the rotatable table 2 can be made of a very simple structure, and the construction cost can also be drastically reduced as compared with a prior art type construction.

In the second and the third preferred embodiments, since as a means for controlling the rotation of the rotatable table 2 a single drive source such as a motor or a pump is provided and the direction of the rotation of the table 2 imparted by the drive source is determined by selection between the screws 18a and 18b, in the third preferred embodiment, or by switching over of the valve 16, in the second preferred embodiment, the number of components is small, and efficient sun tracking is possible.

Figure 8:
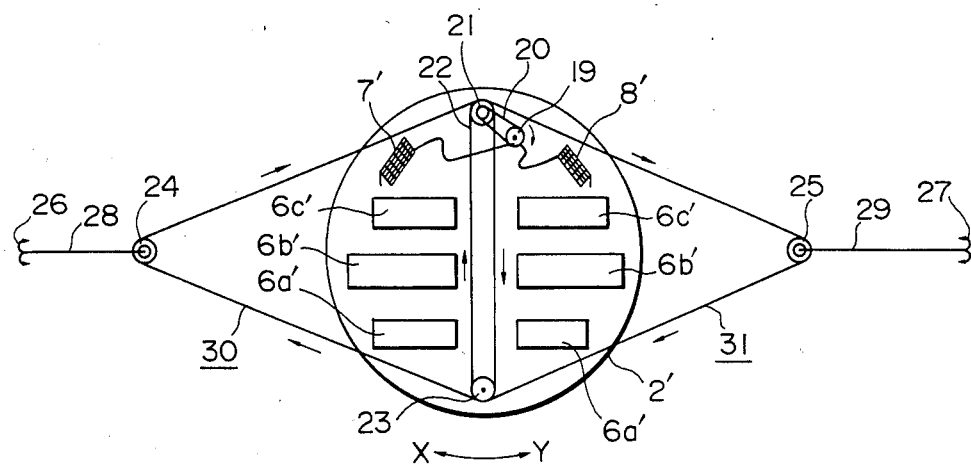
FIGS. 8 and 9 show a solar power generating system which incorporates a fourth preferred embodiment of the sun tracking device according to the present invention.
Figure 8:
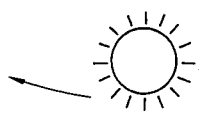
Figure 9:
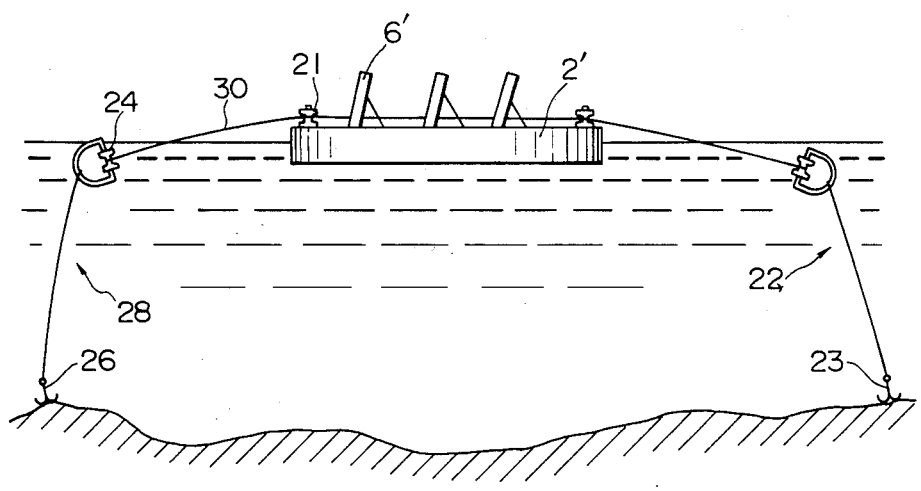

FIG. 8 is a plan view of a fourth preferred embodiment of the sun tracking device of the present invention, while FIG. 9 is a side view thereof. Parts of this fourth preferred embodiment which generally corresponds (albeit with some differences) to parts of the first through the third preferred embodiments shown in FIGS. 1 through 7 are designated by like reference numerals suffixed by primes. In this fourth preferred embodiment, the arrangement of the rotatable table 2' is different from the first three preferred embodiments. As before, the rotatable table 2' is internally provided with a floating force providing means such as a set of buoys, and floats on the water surface while maintaining a horizontal attitude. However, in this fourth preferred embodiment, no such vertical shaft as the fixed shaft 1 of the first through the third preferred embodiments is provided; instead, the rotatable table 2' is maintained in a desired position with an appropriate orientation on the water surface by arrangements which will now be described.

Reference numeral 20 denotes a belt such as a cogged belt, a V-belt or the like, which transmits the rotation provided by a motor 19 to a pulley 21 rotatably mounted on the rotatable table 2' at one point on the circumference thereof, and the drive force of the motor 19 is further transmitted from this pulley 21 to a pair of pulleys 22 fixedly coupled thereto and mounted coaxially therewith, only one of which can be seen in the drawing because they are superposed on one another. And approximately at the diametrically opposite point on the circumference of the rotatable table 2' to the latter, pulleys 21 and 22 there is freely rotatably mounted a pair of idler pulleys 23 which are also superposed on one another. Reaction pulleys 24 and 25 are mounted respectively on the left and the right sides as seen in the figures of the rotatable table 2', and these pulleys 24 and 25 are fixedly coupled, via coupling means such as ropes or chains or the like 28 and 29 respectively, to the solid ground by respective means 26 and 27, which may be anchors lodged in the bottom of the body of water on which the solar energy collection system floats, or may be portions of the ropes or chains 28 and 29 affixed to bodies on solid land such as trees or posts or the like. On the left side of the system as shown in FIG. 8, a substantially unstretchable endless belt 30 is passed around one of the pulleys 22, around one of the pulleys 23, and around the pulley 24 and is tautened, while on the right side of the system as shown in FIG. 8 another substantially unstretchable endless belt 31 is passed around one of the pulleys 22, around one of the pulleys 23, and around the pulley 25 and is likewise tautened. By the tension of the endless belts 30 and 31 and of the coupling means 28 and 29 between the solid ground anchoring means 26 and 27, the rotatable table 2' and the solar energy collection system as a whole are kept approximately in a determinate translation (or x-y) position on the surface of the water. By the rotation by the motor 19 of the pulleys 21 and 22 in one rotational direction or the other, the endless belts 30 and 31 can be fed around the pulleys 22, 23, and 24 and 23, 24, and 25 respectively in one or the other rotational direction, so as to turn the rotatable table 2' around its central axis in the appropriate rotational direction, as desired.

As before, a solar cell array 6' comprising solar cell subarrays 6'a, 6'b, and 6'c is mounted on the upper surface of the table 2' with the light receiving surfaces of the solar cell array 6' directed generally in the same direction with a certain inclination relative to the horizontal plane. Reference numerals 7' and 8' denote solar cells provided on the table in a mutually opposing manner similar to that utilized for the previously described preferred embodiments, and not only the output voltages of these solar cell arrays 7' and 8' may be used for rotationally driving the motor 19, while the difference between the output power amounts of the solar cell arrays 7' and 8' is utilized for determining the rotational direction of the motor 19.

Now, the operation of this fourth preferred embodiment will be described. It should be noted that, as suggested in FIG. 8, for an installation in the northern hemisphere it is desirable that the line between the solid ground anchoring means 26 and 27 should run approximately east-west.

In the case that the angular position in a horizontal plane of the sun with respect to this sun tracking device is on the line of symmetry between the solar cell array 7' and the solar cell array 8', (although of course the sun rises above the line of symmetry), then the voltage produced by the solar cell array 7' is substantially equal to the voltage produced by the solar cell array 8', and accordingly to this the motor 19 is not substantially powered, and the rotatable table 2' is not substantially rotated thereby in either rotational direction. This control action for the motor 19 may be performed by an electrical control system, or by some simple arrangement of resistors and relays and the like.

But if the rotatable table 2' should become somewhat angled away from the direction of the sun light due to an effect produced by waves or the like or due to the motion of the sun, so that the angular position in a horizontal plane of the sun with respect to the sun tracking device is displaced towards one of the solar cell arrays 7' or 8' form the line of symmetry previously defined, then the voltage produced by the other one of the solar cell arrays 7' and 8' becomes less than the voltage produced by the one of the solar cell arrays 7' and 8', and according to this the electrical control system drives the motor 19 in such a direction as to rotate the endless belts 30 and 31 in such appropriate directions as to turn the rotatable table 2' in the appropriate rotational direction to bring the angular position in a horizontal plane of the sun with respect to the sun tracking device closer to the line of symmetry of the apparatus.

As a result of this action which functions similarly to the action of the first through the third preferred embodiments to produce a feedback position regulatory mechanism, it will be easily understood that the rotatable table 2' is caused to maintain its orientation with the sun square on to the line of symmetry and with the light of the sun impinging squarely upon the solar cell arrays 6'a, 6'b and 6'c, so that the solar cell arrays are caused to generate the maximum amount of electricity practicable. And, as before, as the sun moves through the sky during the day from sunrise through noon to sunset, the rotatable table 2' rotates appropriately following changes in the direction of the sun light, generally keeping the relative orientation to the sun as shown in FIG. 8 which relates to the time of approximately noon, and thereby the solar cell arrays 6'a, 6'b and 6'c are enabled throughout the day to be best oriented for power generation. This is repeated day after day. Therefore, the solar cell arrays 6'a, 6'b and 6'c on the rotatable table 2 can efficiently absorb solar energy.

Figure 10:
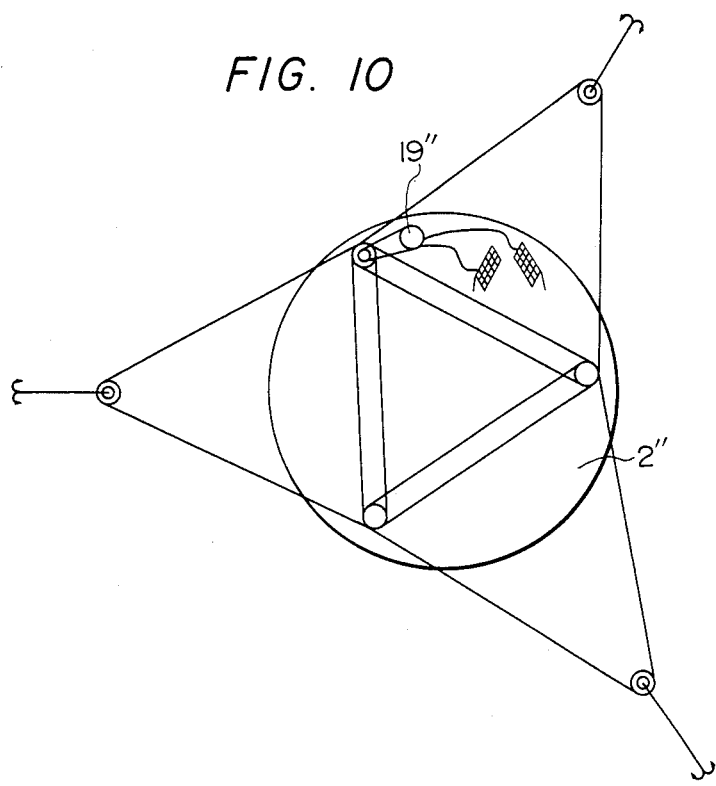
FIG. 10 is a plan view showing a solar power generating system which incorporates a fifth preferred embodiment of the sun tracking device according to the present invention.

FIG. 10 shows a fifth preferred embodiment of the present invention; the details thereof will be easily supplemented by a person of ordinary skill in the art, based upon the disclosure already given. In this fifth preferred embodiment, the number of the fixing means and the endless belts is increased to three, in order even better to stabilize the rotatable table 2" on the water. Further description would be superfluous and redundant and thus will be eschewed herein.

Although in the above fourth and fifth preferred embodiments belts and pulleys were used for rotating the rotatable tables 2' and 2", it would also be possible to use chains, sprockets, or other power transmitting means to achieve the same object.

Thus, according to the fourth and fifth preferred embodiments embodiments of the present invention described above, without erecting any shaft in the water such as the fixed shaft 1 of the first through the third preferred embodiments for supporting the rotatable table 2' or 2", the rotatable table 2' or 2" is fixed by the engagement means including chains and belts which may be engaged to the bottom of the water or to dry land, and the solar cells 7' and 8' are used as sensors, so that the rotatable table 2' or 2" may be rotated by driving the pulleys. Therefore, the rotatable table 2' or 2" may be placed on the surface of any convenient body of water more or less irrespective of the water depth, and the construction cost can thus be drastically reduced as compared with the first through the third preferred embodiments.

Accordingly, although the present invention has been shown and described in terms of certain preferred embodiments, and with reference to the appended drawings, it should not be considered as being particularly limited thereby, since the details of any particular embodiment thereof, or of the drawings, could be varied without departing from the concept of the invention. Thus, the scope of the present invention is to be delimited not by any of the perhaps purely fortuitous features of the shown embodiments, or of the drawings, but solely by the accompanying claims, which follow.

What is claimed is:

1. A sun tracking device, riding on the surface of a body of liquid, comprising:
    (a) a rotatable table which is substantially supported by floatation on said surface of said liquid;
    (b) means for keeping said rotatable table substantially in a determinate translational position on said surface of said liquid while allowing said rotatable table to rotate;
    (c) means for rotationally positioning said rotatable table on said surface of said liquid;
    (d) means carried by the table for powering the rotational positioning means and for detecting deviation of the angular position of the sun in relation to said rotatable table, said powering and detecting means comprising a pair of solar cells oriented at different angles relative to said rotatable table; and
    (e) means responsive to the powering and detecting means, for controlling said rotational positioning means so as to reduce said deviation of the angular position of the sun in relation to said rotatable table substantially to zero, said means for controlling said rotational positioning means further including means for varying the direction of rotation of said rotatable table imparted by the rotational positioning means in accordance with the one of said pair of solar cells having the greater output.

2. A sun tracking device according to claim 1, wherein said translational position keeping means is fixed to the bottom of said body of liquid.

3. A sun tracking device according to claim 1, wherein said translational position keeping means is fixed to dry land.

4. A sun tracking device according to claim 2, wherein said translational position keeping means is fixed to the bottom of said body of liquid at a portion thereof substantially underneath said rotatable table.

5. A sun tracking device according to claim 2, wherein said translational position keeping means is fixed to the bottom of said body of liquid at a portion thereof a substantial distance from the portion thereof underneath said rotatable table.

6. A sun tracking device according to claim 4, wherein said translation position keeping means comprises a shaft fixed to the bottom of said body of liquid at a portion thereof substantially underneath said rotatable table, rotatably mounted to said rotatable table.

7. A sun tracking device according to claim 6, wherein said shaft is mounted to said rotatable table so as to be vertically movable with respect thereto through a certain distance as the level of said surface of said liquid changes.

8. A sun tracking device according to claim 6, wherein said shaft is mounted to said rotatable table so as to allow wobbling with respect thereto through a certain angle as the level of said surface of said liquid undulates.

9. A sun tracking device according to claim 3, wherein said translational position keeping means comprises a set of tautened flexible links.

10. A sun tracking device according to claim 9, wherein said rotational positioning means comprises a means for selectively pulling on said set of tautened flexible links.

11. A sun tracking device according to claim 1, wherein said rotational positioning means comprises means for reacting against the dry land.

12. A sun tracking device according to claim 1, wherein said rotational positioning means comprises means for reacting against the bottom of said body of liquid.

13. A sun tracking device according to claim 1, wherein said rotational positioning means comprises means for reacting against said body of liquid.

14. A sun tracking device according to claim 13, wherein said rotational positioning means comprises a liquid jet.

15. A sun tracking device according to claim 13, wherein said rotational positioning means comprises a propeller which drives said liquid.

16. A sun tracking device, riding on the surface of a body of liquid, comprising:
 (a) a rotatable table which is substantially supported by floatation on said surface of said liquid;
 (b) a pair of solar cells mounted on said rotatable table at different orientations;
 (c) a motor driven by said solar cells;
 (d) a plurality of first rotating bodies rotationally driven by the driving force of said motor;
 (e) a plurality of second rotating bodies provided externally to said rotatable table;
 (f) a plurality of drive force transmitting members arranged between said first rotating bodies and said second rotating bodies so as to constitute at least two drive force transmitting systems; and
 (g) means for controlling the rotation of said motor and switching over the rotational direction of said driving force transmitting systems according to the amounts of light received by each of said pair of solar cells;
 (h) wherein said rotatable table is rotated so as to track the sun.

* * * * *